Dec. 22, 1925.
C. W. CRANNELL
1,566,833
TOOL FOR ASSEMBLING SPRINGS
Filed Jan. 5, 1925
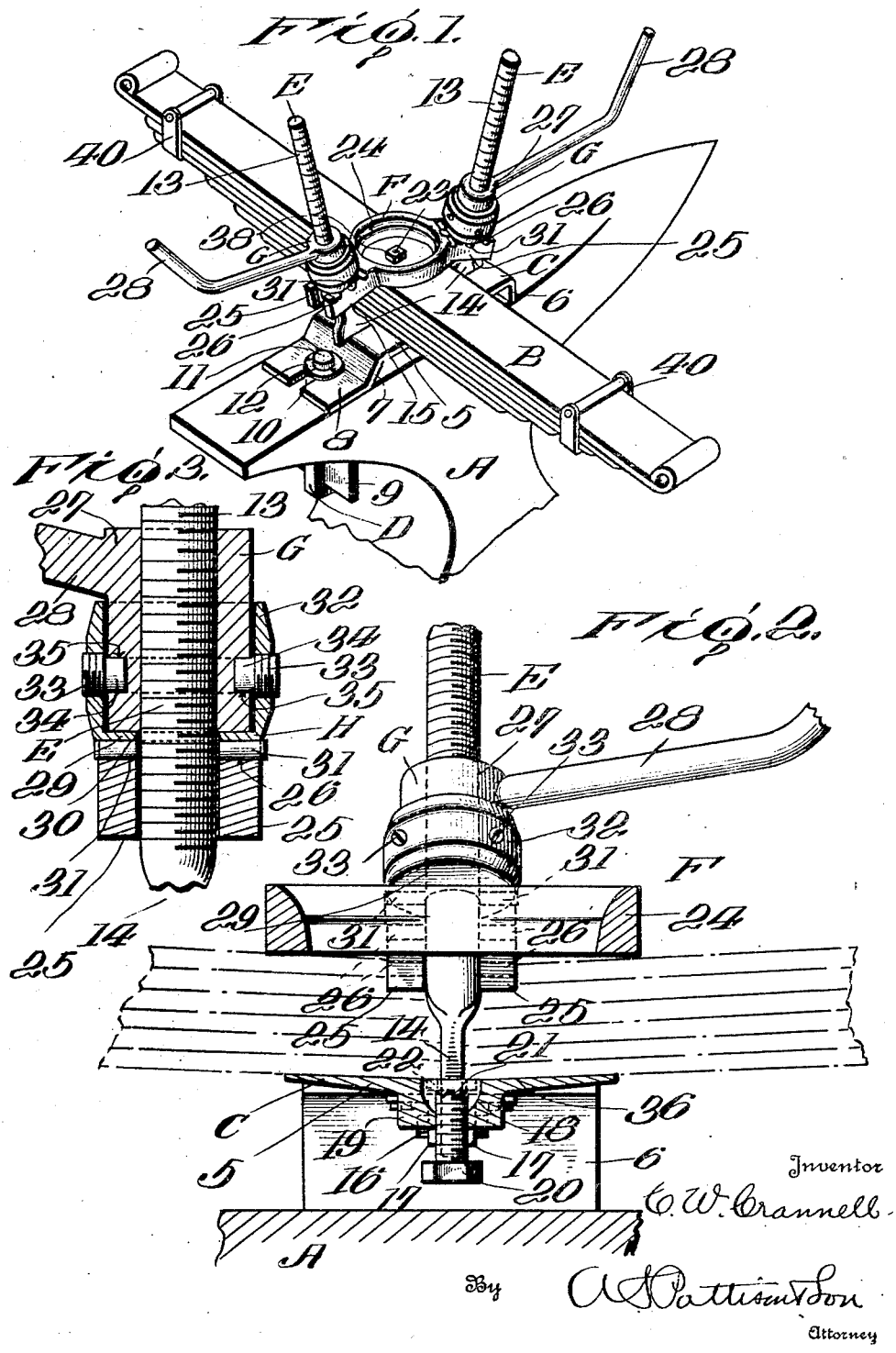
Inventor
C. W. Crannell
By A. S. Pattison & Son
Attorney Patented Dec. 22, 1925.

1,566,833

UNITED STATES PATENT OFFICE.

CHARLES W. CRANNELL, OF CHAPPELL, NEBRASKA, ASSIGNOR OF ONE-HALF TO BENJAMIN J. CONNOR, OF CHAPPELL, NEBRASKA.

TOOL FOR ASSEMBLING SPRINGS.

Application filed January 5, 1925. Serial No. 629.

*To all whom it may concern:*

Be it known that I, CHARLES W. CRANNELL, a citizen of the United States, residing at Chappell, in the county of Deuel and State of Nebraska, have invented certain new and useful Improvements for Tools for Assembling Springs, of which the following is a specification, reference being had therein to the accompanying drawing.

This invention relates to an improvement for a tool for assembling springs, and pertains more particularly to a device for taking down and assembling truck, automobile and other springs.

Heretofore the assembling or taking apart for repair of springs has been a tedious and awkward undertaking, as there is no tool, so far as is known, which is designed to do this kind of work and is suitable for use as a part of the equipment of garages, blacksmith shops, or the like.

It has generally been the practice to use thumb clamps and a vice which results in an untold amount of labor and trouble, because of the bolts in the spring turning and the thumb clamps working loose and permitting the spring leaves to fly all over the workshop.

There are many truck springs that weigh in the neighborhood of one hundred pounds each and with the tools heretofore in use, it has been a difficult undertaking to get them together or apart. The result has been that with the tools heretofore known it has proven more costly to repair springs than to buy new springs from the factory and replace those broken.

By the use of the present invention, the trouble and hardship in working on springs is done away with, and springs can be assembled and taken apart by one person with the use of this improved device.

The object of this invention is to provide a tool for assembling and taking apart springs, which is of a construction to be easily and efficiently operated by one person.

Another object of the invention is to provide an improved tool of the character described, which provides means for holding the heads of the bolts in the springs from rotating.

Another object of the invention is to provide a tool for working on springs which is highly efficient in operation, cheap of manufacture and simple of construction and is capable of being sold at a price which would permit of its being an equipment of garages, blacksmith shops or the like.

Other objects, novel features of construction and improved results of the invention will appear in the following description and accompanying drawings.

In the drawings:

Figure 1 is a perspective view showing the application of the invention for working on a vehicle spring.

Fig. 2 is a vertical sectional view of Fig. 1.

Fig. 3 is an enlarged detailed vertical sectional view through the handle nut and rocker.

In the broad terms of description, the device, as shown in the drawings, comprises an anvil A, vehicle springs B, a clamp-base C, a clamp-base swivel D, the clamp-base arms E, the clamp F, the handle nuts G, and the rockers H.

Although the invention is shown and described as being supported upon and fastened to an anvil, it will be readily understood that the method of fastening the device can be utilized in attaching the same to a workbench, plank, or any other suitable place.

Describing the embodiment of the invention shown in the drawings more specifically, it will be seen that the base C is provided with a main base or working face 5, and that this portion of the base is supported above the anvil by reason of the base at one end having its end turned down at right angles as at 6, while its opposite end is bent downwardly at 7 to terminate in an outwardly extending portion 8, which I have termed the "heel." The base is fastened to the anvil by means of a square pin D, which is inserted through the squared opening usually found in anvils. The lower end of the pin is provided with a slot which receives a wedge 9, by means of which the base is securely fastened to the anvil. To permit of adjustment of the base in respect to the pin, the heel of the base is provided with a slot 10, through which the pin passes and to afford a greater adjustment of the base, the upper end of the pin is provided with an enlarged head 11 and washer 12, to permit the base to swivel or turn in respect to the pin, by slightly loosening the wedge 9.

The arms E are circular and threaded as at 13, throughout the greater part of their length and are provided with flattened lower ends 14, extending through slots 15 in the base to be pivotally mounted as at 16, in the forked lugs 17, or the like, carried by the lower face of the base.

Centrally located in the working face 5 of the base is an opening 18, surrounded at its lower edge by a boss 19, which is threaded to receive the bolt 20, the end of which is roughened or notched as at 21. By reason of the base being elevated above the anvil, the head of the bolt 20 is easily accessible by a wrench so that its roughened end 21 can be tightened to engagement with the head 22 of the center bolt 23 of the spring B.

The clamp F, which may be hereinafter referred to, as a tie-bar, is cast in one piece to provide a circular member 24, having extending from its opposite sides the slotted or forked arms 25. These arms extend downwardly from the ring at a slight angle and are provided in their upper faces with a series of grooves or notches 26.

The handle nuts G are composed of threaded nutted portions 27, which are carried upon the threaded ends of the base arms E. These nuts are provided with upwardly extending handles 28, which afford convenient operation and at the same time provide a leverage whereby these nuts can be screwed down very tightly.

The rockers H are cup-shaped washers having a base 29, provided with a circular opening 30, which is greater in diameter than the base arms E, so that these rockers loosely surround the arms. The lower face of each rocker is provided at opposite sides of the opening with rounded ribs or lugs 31, which are adapted to engage the grooves 26 in the upper face of the forked arms of the clamp. Extending upwardly from the base of the rockers are side walls or portions 32, which parallel the outer surface of the nuts 27. These side walls screw-threadedly carry the bolts 33, the ends 34 of which extend into circumferential grooves 35, provided in the outer faces of the nuts 27. By this construction, it will be seen that the nuts can be rotated without imparting rotation to the rockers, and that any upward or downward movement of the nuts will likewise impart a similar motion to the rockers.

Attention is directed to the fact, as clearly appears in Fig. 2 of the drawing, that the working face 5 of the base is slightly concaved as appears at 36 to fit the contour of the spring B. It will also be seen clearly in this figure of the drawing that the inner upper edge of the ring portion of the clamp F is rounded, as at 37, and that the construction of the clamp is such that the nut 38 of the center bolt of the spring can be readily loosened by a wrench in the hands of an operator.

Having described the component parts of the invention, a short description will be given of its operation.

*Operation.*

In utilizing the invention to take a spring apart, the clamp base is positioned conveniently for use by means of swivel pin and tightly fastened through the medium of the wedge. The spring B is then placed upon the working face of the clamp base with the head of the center bolt of the spring positioned in the opening in the working face of the clamp base. The clamp F or tie-bar is then placed in position and the handle nuts tightened down. The result is that the spring is tightly clamped between the working face of the base and the tie-bar. The setscrew 20 is then tightened against the head of the center spring bolt to prevent its rotation. It remains only for the operator to insert a wrench in the ring of the clamp F and loosen the center spring bolt nut 38 to take the leaves of the spring apart. No difficulty is encountered in loosening the spring clips 40.

To assemble the spring a center bolt is inserted through a few of the spring leaves, the center bolt head being placed on the end of the setscrew. Additional leaves are then added, keeping the center holes of the leaves well aligned with the bolt until all of the leaves are in a straight position. The tie-bar is then placed over the topmost sleeve of the spring and the handle nuts tightened down. The leaves are aligned as the tie-bar is tightened. The adjustment of the center bolt will be readily understood when it is remembered that there is considerable space between the spring leaves when loose, due to the "gather" of the leaves.

It will be seen that it only remains for the workman to tighten the center bolt nut to complete the assembling of the spring.

From the foregoing it will be seen that I have provided a device for working upon springs, which is very simple in construction and cheap of manufacture, and that springs can be taken apart and assembled by one workman.

Because of the pivotal connection of the base-arms, and the slot in the clamp-base, these arms can be manipulated to the proper position for work on springs of different sizes. The tie-bar is also adaptable for use on springs of different sizes, because of the projecting forked arms which are at an angle to the clamp-ring and because the rockers can engage either of the several grooves in the arms. By reason of this construction, the rockers are conformable to any degree of angle of strain on the base, arms or rods E.

It will be readily understood that because of the construction heretofore described, the handle nuts can be rotated to loosen or tighten sufficiently to change the tension on the tie-bar without causing disengagement of the rockers with the grooves in the tie-bar or clamp-arms.

Having thus described my invention, what I claim and desire to secure by Letters Patent is:

1. In a device of the character described, a base, a movable clamping ring above said base, and means to lock said clamping ring in clamped position upon the work, whereby said work is accessible through said clamping ring.

2. In a device of the character described, a base, a movable clamping member above said base provided with an opening, and means for engaging said clamp to lock the same in clamped position, whereby the work clamped is accessible through said clamp opening.

3. In a device of the character described, a base provided with upwardly extending arms, a clamping ring movable above said base, and means carried by said arms for locking the clamp in clamping position upon the work, whereby the work is accessible through said ring opening.

4. A device of the character described, a base provided with upwardly extending pivotally mounted arms, and a ring clamp movable above said base and having extending portions adapted for engagement with locking members carried by said arms, whereby said ring is locked in clamped position upon the work and the work is accessible through said ring opening.

5. In a device of the character described, a base adapted for horizontal pivotal mounting and provided with pivotally mounted upwardly extending arms carrying locking members, a clamp adapted for movement in respect to said base, and said clamp having outwardly extending portions adapted to be engaged by said locking members.

6. In a device of the character described, a base, a clamp movable above said base, said clamp comprising a ring having outwardly extending arms, and locking members adapted for engagement with said clamping arms for locking the ring in clamped position, whereby the work clamped is accessible through said clamping ring.

7. In a device of the character described, a base, a clamp movable above said base, said clamp comprising a ring provided with outwardly extending arms at its opposite sides, said arms provided with a plurality of depressions, and locking members having extending portions adapted for engagement with depressions of the clamp arms for locking the ring in clamped position, whereby the work clamped is accessible through said clamping ring.

8. In a device of the character described, a base provided with upwardly extending arms, a clamp movable above said base, the clamp comprising a ring provided with outwardly extending separated arms at its opposite sides, said arms adapted to receive the upwardly extending base arms, and locking members carried by said base arms and adapted for engagement with the clamp arms for locking the ring in clamped position, whereby the work clamped is accessible through said clamping ring.

9. A device of the character described, a base, a clamp movable above said base, said clamp comprising a ring provided at its opposite sides with outwardly extending arms, the base provided with a centrally located opening carrying a bolt adapted for engagement with the work on said base, and locking means adapted for engagement with the outwardly extending clamp arms for locking the ring in clamped position upon the work, whereby the work clamped is accessible through said clamping ring.

10. In a device of the character described, a base having a centrally raised portion adapted to receive the article to be worked upon, upwardly extending arms pivotally mounted on said base, a clamp comprising a ring having outwardly extending arms adapted to receive the upwardly extending base arms, a bolt rotatably mounted in said base and adapted for engagement with the work, and locking means carried by said base arms and adapted for engagement with the outwardly extending clamp arms for locking the ring against the work, whereby the work clamped is accessible through said clamping ring.

11. In a device of the character described, a base provided with pivotally mounted upwardly extending arms, a clamp movable above said base and comprising a ring having outwardly extending arms adapted to receive the upwardly extending arms of the base, means carried by said base arms adapted for engagement with the clamp arms for locking the ring in clamped position, and movable means centrally located in the base for engaging the article being worked upon, whereby the work clamped is accessible through said clamping ring.

12. A tool for working upon springs or the like, comprising a base, a clamp comprising a ring movably mounted above said base to clamp the spring upon the base, means for locking the ring in clamped position, movable means in the base for engaging the heads of the spring bolts, said ring providing an opening in the clamp, whereby the nuts of the spring bolts are accessible through the clamping ring.

13. In a device of the character described, a base provided with pivotally mounted upwardly extending arms, a clamp movable above said base and comprising a ring having outwardly extending arms adapted to receive the upwardly extending arms of the base, said clamp arms extending at a downward angle from the clamp ring, and means carried by said base arms adapted for engagement with the clamp arms, whereby the ring can be locked in clamped position irrespective of the angle of tension on the locking means, whereby the work clamped is accessible through said clamping ring.

14. A tool for working upon springs or the like, comprising a base provided with pivotally mounted upwardly extending arms, a clamp movable above said base and comprising a ring having outwardly extending arms at a downward angle to said ring and adapted to receive the upwardly extending arms of the base, said clamp arms provided with a plurality of depressions, and locking means carried by the base arms having extending portions adapted for engagement with the depressions of the clamp arms, whereby the ring can be locked in clamped position irrespective of the angle of tension upon the locking means or base arms, whereby the work clamped is accessible through said clamping ring.

15. A tool for working upon springs or the like, comprising a base provided with upwardly extending pivotally mounted arms, a clamp comprising a ring having outwardly extending arms movable above said base to clamp the spring upon the same, a rotatably mounted member in said base adapted for engagement with the work, and locking means carried by the base arms and adapted for engagement with the clamp arms for locking the ring in clamped position, whereby the work clamped is accessible through said clamping ring.

In testimony whereof I hereunto affix my signature.

CHARLES W. CRANNELL.